Sept. 29, 1953      C. C. PINE ET AL      2,654,086
SAFETY DEVICE FOR INSTRUMENT APPROACH SYSTEMS
Filed Feb. 17, 1950
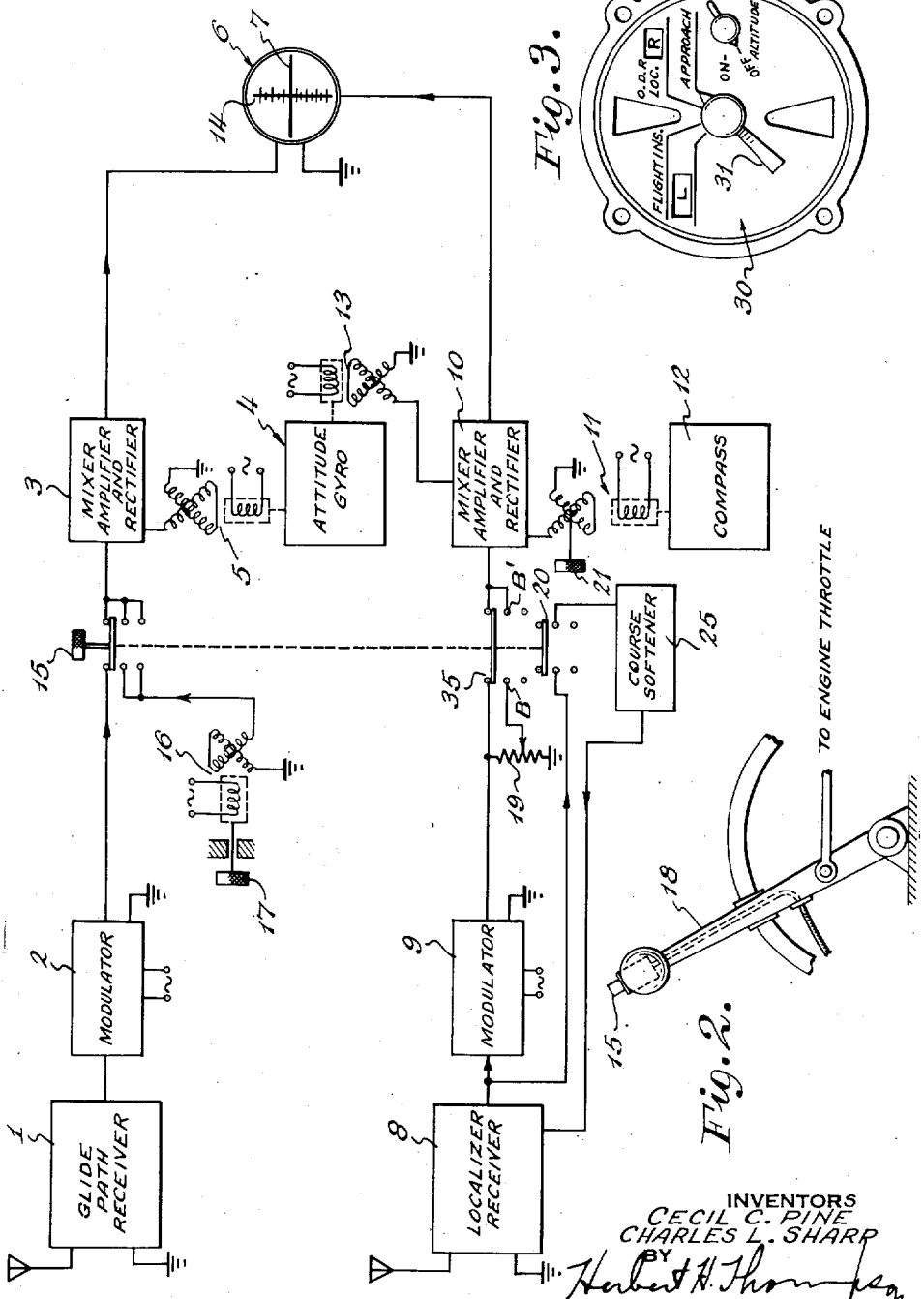
INVENTORS
CECIL C. PINE
CHARLES L. SHARP
BY
Herbert H. Thompson
THEIR ATTORNEY Patented Sept. 29, 1953

2,654,086

UNITED STATES PATENT OFFICE 2,654,086

SAFETY DEVICE FOR INSTRUMENT APPROACH SYSTEMS

Cecil C. Pine, Lake Ronkonkoma, and Charles L. Sharp, Setauket, N. Y., assignors to The Sperry Corporation, a corporation of Delaware Application February 17, 1950, Serial No. 144,834

12 Claims. (Cl. 343—108)

This invention relates to improvements in radio guidance approach systems or blind landing systems for aircraft, and is especially adapted as an addition to the airplane navigational system and zero reading indicator described in the prior applications of Spencer Kellogg, 2nd, Serial No. 15,064 for Flight Instrument System for Dirigible Craft, filed March 16, 1948 now Patent No. 2,613,350 issued October 7, 1952, and Serial No. 128,227 for Control Systems, filed November 18, 1949, now Patent No. 2,613,352 issued October 7, 1952, both assigned to the assignee of the present application. According to this system, the two pointers of the indicator for "off course" and "out of trim" are combined on a single face or dial and both normally read zero, so that all the aviator need do is to keep the course and pitch pointers on the indicator at the zero or normal position to bring the craft in for a smooth landing.

As explained in the aforesaid applications, this instrument may also be used during normal flight and for this purpose a selector switch is provided for the different uses of the instrument under different conditions. The present invention concerns only the blind landing operation, so that the present disclosure will be confined to this use of the instrument in or immediately following this operation.

When making an instrument approach, it often happens that at the last minute the aviator finds that he cannot land on the landing strip selected and it is therefore necessary at times just before the touchdown is reached to abandon his intention to land and instead to fly up and perhaps go around for another approach. When this happens the pilot must cease coming down the glide path and must immediately trim the aircraft to a greater angle of attack and preferably also "gun" the engine to climb away from the field and avoid obstacles beyond the runway. Since the pilot has been relying upon his zero reading indicator up to that point, it would be very helpful to the pilot if he could continue to rely on the same instrument, so that he may continue to follow it at least until he has climbed to sufficient altitude and is ready to "go around" for another approach.

According to our invention, therefore, we provide an extra switch in the circuits between the radio guidance signals and the zero reading flight indicator which when thrown will sever the indicator input from the glide path guidance beam signal, at least, thereby discontinuing the descent signal and preferably also showing a fly up signal. At this time the signal from the localizer beam may also be severed or preferably modified so that although the localizer beam may continue to be followed, the course indicating pointer will not be disturbed by close approach of the aircraft to the localizer transmitter, and excessive bank angles avoided.

Referring to the drawings,

Fig. 1 is a schematic view showing how our "go around" switch may be used when the zero reading indicator is being used in instrument approach operation;

Fig. 2 shows a convenient location for the switch on the engine throttle, so that pressing of the switch button may be made simultaneous with the increased engine throttle; and Fig. 3 shows the selector switch usually used in connection with the known zero reading guidance system to which this invention relates.

As explained in the aforesaid applications, during radio guided approaches, the output of the radio glide path receiver 1 after passing through the modulator 2 is led to a mixer amplifier and rectifier 3 where this signal is combined with the stabilizing pitch signal from the gyro-vertical 4. The pitch signal is represented as generated by a synchro 5 on the pitch axis of gyro 4, which produces a signal proportional in amount to the departure of the craft from a level or trim position and reversible in phase when such departure is up or down. The combined A. C. signal is amplified and rectified and the output led to the zero reading indicator 6 thereby causing movement of the horizontal pointer 7 up or down from its zero or central position, according to whether the aircraft needs trimming up or down to keep it on the glide path.

As explained in the aforesaid applications, it is characteristic of this type of meter that it read zero not only when the aircraft is flying on the glide path (or level), but also when the aircraft has departed from the glide path as soon as its trim has been changed proportionate to the amount of departure to bring the aircraft smoothly back into the glide path.

Similarly, the output of the localizer receiver 8 is led through a modulator 9 and to a mixer amplifier and rectifier 10 where the signal is combined with two other signals, one a course signal from the synchro 11 operated from the compass 12 and the other a signal from the synchro 13 operated from the bank axis of the gyro-vertical 4. The combined output of the three signals is fed to the indicator 6 to cause lateral movement of the pointer 14 to the right or left from its normal or zero position. As with the case of the pointer 7, the pointer 14 will read zero not only when the craft is on the radio course, but also if off course when the craft is banked at a proportional angle proportionate to course departure to cause the craft to return smoothly to its radio course.

According to our invention, we provide an emergency switch or push button 15 which the aviator may press or throw, in case he desires not to land when approaching the touchdown point, but decides to go around again. The pressing of push button 15, it will be seen, will sever the output of the glide path modulator 2 from the mixer rectifier 3 thus leaving the signal from the attitude gyro in sole control to erase the downward glide signal. As shown in the aforesaid prior application Serial No. 128,227 of Spencer Kellogg, a biasing signal 102 may be supplied to the glide path signal whenever the selector switch 29—30 is thrown clockwise into the approach position, so that the aircraft need not fly above the beam, if otherwise necessary to obtain a signal balancing that from the attitude gyro when flying down the glide path. In such case, switch 15 of this application in severing the output from the glide path receiver would likewise sever the aforesaid biasing means. At the same time, we modify the gyro signal to call for a climb, by throwing in another biasing means such as a signal from a synchro 16 which is given a predetermined displacement from knob 17 so as to set in a predetermined pitch signal into the mixer, thus causing the indicator to immediately call for a climb at a safe angle. As the engine speed should be increased simultaneously, we have shown the button as conveniently placed on the engine throttle 18 (Fig. 2), so that the two operations may be accomplished as one.

The same button 15 also preferably either breaks the circuit from the localizer modulator or modifies the signal therefrom to prevent erratic operation of the meter as the craft closely approaches the localizer transmitter. Pressing the button, therefore, also first opens the bridging contact 35 in the circuit between modulator 9 and the receiver 10 and closes a circuit between contacts B and B' thereby placing a signal limiter in the shape of a variable resistor 19 in the circuit designed to limit any bank angle indication to a maximum of about 10 degrees, so that excessive banks will be avoided while the craft is near the ground. The button is also shown as having a third contactor 20 which throws into the circuit a device 25 for reducing the amplitude of the signals from the localizer receiver as the transmitter is being approached. Such an operation is termed in the art "course softening" and is described in the patent to T. M. Ferrill, Jr., No. 2,439,044, dated April 6, 1948 for Course Softening Systems, assigned to the assignee of the present invention. A third position of the switch is shown in which the localizer receiver is completely disconnected. Under such condition, the craft will still be kept on course by following the zero reading indicator and if course changes are desired the synchro 11 could be adjusted from the knob 21.

As soon as the craft is safely away from the landing field the pilot, by operating his selector switch 30 (shown in more detail in the second of the aforesaid Kellogg applications) may resume the flight system desired by restoring switch 15 to its normal position and by moving the course selector handle 31 to the flight instrument position for regular cross country flight or to the ODR position for radio guided cross country flight or resume the approach position, in which case, by following the indicator 6, the pilot will again cause the craft to approach and reach a landing position over the landing field runway, all as more fully described in the aforesaid Kellogg applications.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Thus our invention is not limited to the use of a visual flight indicator such as a zero reading cross pointer meter, but is also applicable for use in an airplane equipped with an automatic pilot having a radio approach system in which the radio glide path and localizer beams operate through the automatic pilot for automatic approach and landing, such as disclosed in the patents to F. L. Moseley, Nos. 2,423,336 and 2,423,337, dated July 1, 1947 for Radio Controlled Pilot System. In other words, the course or azimuth guidance signals generated in applicants' mixer amplifier and rectifier 10 and the guidance signals for trim or pitch generated in applicants' mixer amplifier and rectifier 3 may be used as signals to operate the craft's aileron and elevator servo motors respectively, instead of operating such control surfaces through the intermediary of the human pilot who observes and follows the zero reading indicator 6. We, therefore, wish it understood that our invention is adapted for either method of approach, that is, through a human pilot or through an automatic pilot, the compound guidance signals being substantially the same in both instances, but in one case operating a visual indicator and in the other the servos of the automatic pilot. Specific claims to the latter system are reserved for a companion application Serial No. 148,836 filed March 10, 1950 now Patent No. 2,611,128 issued September 16, 1952, for Safety Device for Automatic Approach Systems.

What is claimed is:

1. In a radio approach system for instrument landing having a glide path receiver producing a signal upon departure of the craft from the glide path, an attitude maintaining instrument having means producing pitch signals upon pitch or climb of the craft, a guidance means responsive to signals produced by both said receiver and said attitude instrument, normally idle means for biasing the signal from said instrument to call for a climb at a predetermined angle, and manually operable means for rendering said guidance means responsive only to the signal from the attitude instrument biased from said biasing means.

2. In a radio approach system for instrument landing having glide path and localizer receivers, means for generating a trim or pitch guidance signal and a course guidance signal, course, pitch and bank attitude maintaining instruments, guidance means normally responsive as to pitch to signals produced by both said glide path receiver and the pitch attitude of said attitude instrument, and as to course from said localizer receiver, the bank attitude of said attitude instrument and said course instrument, and manually operable means for rendering said guidance signal responsive in pitch only to said attitude instrument and in course only to said course instrument and the bank attitude of said attitude instrument.

3. In a radio approach system for instrument landing having a glide path receiver adapted to produce pitch signals upon departure from the glide path, an indicator of the zero reading type, an attitude maintaining instrument adapted to produce signals upon change of pitch attitude, said indicator being normally responsive to pitch signals produced by both said receiver and said attitude instrument, and manually operable means for rendering said indicator responsive only to said attitude instrument.

4. A radio approach system for instrument landing as claimed in claim 3, having means for biasing one of said signals during landing approach, whereby the indicator reads zero when the craft is flying directly down the beam.

5. In a radio approach system for instrument landing having a glide path receiver, an indicator of the zero reading type, an attitude maintaining instrument, said indicator being responsive to signals produced by both said receiver and said attitude instrument, normally idle means for biasing the signal from said instrument to call for a climb at a predetermined angle, and manually operable means for rendering said indicator responsive only to the signal from the attitude instrument biased from said biasing means.

6. In a radio approach system for instrument landing having glide path and localizer receivers, an indicator of the cross pointer type, course, and pitch and bank attitude, maintaining instruments, said indicator being normally responsive as to pitch to signals produced by both said glide path receiver and the pitch attitude of said attitude instrument, and as to course from said localizer receiver, the bank attitude of said attitude instrument and said course instrument, and manually operable means for rendering said indicator responsive in pitch only to said attitude instrument and in course only to said course instrument and the bank attitude of said attitude instrument.

7. A radio approach system as claimed in claim 6, having normally idle means for biasing the pitch signal from said attitude instrument to call for a climb at a predetermined angle, said means being brought into action upon operation of the manually operable means of claim 6.

8. A radio approach system for blind landing having glide path and localizer receivers, an indicator of the zero reading type, course and pitch and bank attitude maintaining instruments, said indicator being normally responsive as to pitch to said signals produced by both said glide path receiver and the pitch attitude of said attitude instrument, and as to course from said localizer receiver, the bank attitude of said attitude instrument and said course instrument, normal idle means for biasing the pitch signal from said attitude instrument to call for a climb, and manually operable means for rendering said indicator responsive only to said biasing means and attitude instrument.

9. A radio approach system as claimed in claim 8, in which said manual means also modifies the effective localizer signals to limit the bank angle indicated thereon.

10. A radio approach system as claimed in claim 8, in which said manual means also modifies the effective signals to reduce their volume as the localizer transmitter is approached.

11. A radio approach system for blind landing having glide path and localizer receivers, an indicator of the zero reading type, course and pitch and bank attitude maintaining instruments, said indicator being normally responsive as to pitch to said signals produced by both said glide path receiver and the pitch attitude of said attitude instrument, and as to course from said localizer receiver and the bank attitude of said attitude instrument, normal idle means for biasing the pitch signal from said attitude instrument to call for a climb, and manually operable means for rendering said indicator responsive only to said biasing means and attitude instrument.

12. In a radio approach system for instrument landing having a glide path receiver producing a signal upon departure of the craft from the glide path, an attitude maintaining instrument having means producing pitch signals upon pitch or climb of the craft, a guidance means responsive to signals produced by both said receiver and said attitude instrument, normally idle means for biasing the signal from said instrument to call for a climb at a predetermined angle, and means for severing the radio receiver signal from the guidance means and transferring the same to said biasing means whereby a fly up signal from the attitude instrument is transmitted.

CECIL C. PINE.
CHARLES L. SHARP.

References Cited in the file of this patent

UNITED STATES PATENTS

| Number | Name | Date |
|---|---|---|
| 2,372,185 | Wittkuhns | Mar. 27, 1945 |

FOREIGN PATENTS

| Number | Country | Date |
|---|---|---|
| 516,567 | Great Britain | Jan. 5, 1940 |
| 888,812 | France | Sept. 13, 1943 |